US005476708A

United States Patent [19]

Reed et al.

[11] Patent Number: 5,476,708

[45] Date of Patent: Dec. 19, 1995

[54] SUBSTRATE FOR IMAGE-RECEIVING SHEET MATERIAL

[75] Inventors: Roger J. Reed, Aylesbury; Paul Dunk, Slough; Christopher Cusick, High Wycombe, all of England

[73] Assignee: Glory Mill Papers Limited, High Wycombe, United Kingdom

[21] Appl. No.: 88,414

[22] Filed: Jul. 6, 1993

Related U.S. Application Data

[63] Continuation of Ser. No. 651,220, filed as PCT/GB89/00892, Aug. 3, 1989, abandoned.

[30] Foreign Application Priority Data

Aug. 3, 1988 [GB] United Kingdom .................. 8818457

[51] Int. Cl.[6] ................................................ B32B 27/20

[52] U.S. Cl. ......................... 428/211; 428/328; 428/336; 428/340; 428/341; 428/342; 428/511; 428/513; 428/516; 430/536; 430/538

[58] Field of Search ................................ 428/211, 328, 428/336, 340, 341, 342, 511, 513, 516; 430/536, 538

[56] References Cited

U.S. PATENT DOCUMENTS

| | | | |
|---|---|---|---|
| 4,258,848 | 3/1981 | Akao et al. | 206/524.2 |
| 4,352,861 | 10/1982 | Von Meer et al. | 428/511 |

FOREIGN PATENT DOCUMENTS

| | | |
|---|---|---|
| 0183467 | 6/1986 | European Pat. Off. . |
| 1461260 | 4/1974 | Germany . |
| 3720743 | 1/1988 | Germany . |
| 1-142549 | 6/1989 | Japan . |
| 1335059 | 10/1973 | United Kingdom . |
| 1395358 | 5/1975 | United Kingdom . |

*Primary Examiner*—D. S. Nakarani
*Attorney, Agent, or Firm*—Dilworth & Barrese

[57] ABSTRACT

Photographic base paper (10) has a face side waterproof coating which is a co-extruded layer structure of at least a pigmented core layer (P) and top surface layer (E) of polyethylene. The thickness of layer (E) is no more than 12 μm. The pigment content in the face side coating is at least 2 $gm^{-2}$ and it is distributed such that the proportion by weight of pigment in the core layer is at least 1.75 times as great as the proportion by weight of pigment in the top surface layer. For optimum photodefinition (image sharpness) the top surface layer should be free of pigment, but as thin (1.5 to 3 μm) as possible. The pigment is preferably $TiO_2$.

25 Claims, 4 Drawing Sheets

SUBSTRATE FOR IMAGE-RECEIVING SHEET MATERIAL

This is a continuation of application Ser. No. 07/651,220 filed as PCT/GB89/00892 on Aug. 3, 1989, now abandoned.

FIELD OF THE INVENTION

This invention relates to opaque substrate for image-receiving sheet material. More particularly, but not exclusively, this invention concerns substrates for carrying photographically sensitive materials such as silver halide emulsions and which are for the making of opaque prints (as opposed to transparent photographic negative film or positive transparencies).

BACKGROUND OF THE INVENTION

Photographic print material is usually made by coating sensitized phtographic emulsion on to a waterproof opaque paper base or substrate (often referred to as "photobase"). The prepared paper base has to meet a rigorous specification not only optically and mechanically but also chemically. Thus, it should be inert to the chemistry of the photographic materials coated on it and used to develop the image, it should resist penetration of such chemicals (edge penetration beneath the waterproof coating at cut edges can be a problem), and it should provide adequate stiffness to the laminated material for acceptable mechanical processing and manual manipulation of the developed print.

The optical qualities of the photobase are, however, extremely important to photographic print sensitizer companies striving to offer the market a product of higher quality than their rivals. The photobase should be uniformly and densely opaque and constant in colour and of a specified degree of surface roughness to achieve the required gloss or matte finish. Clearly, such qualities are required in any substrate for an image.

Another optical quality of the image to which the substrate make a contribution is "image sharpness", which in this specification we have called "photodefinition". The nature of the surface of the substrate should reduce as little as possible the sharpness of the image actually achieved by the reaction of the sensitive material in the image-forming layer above the substrate to the pattern of energy incident on it.

Within the photobase industry it is understood that for highest photodefinition, the photobase should present as densely opaque a surface as possible, and that surface as close up behind the developed image as possible. Experience has shown that photodefinition suffers with any increase in distance between the opaque photobase and the photographic layer, as can occur for example with the use of a layer of gelatine as a means of bonding the photographic layer to the substrate. There is some explanation of this phenomenon in GB-A-1339045 of Fuji Photo Film Co. Ltd.

Conventionally photobase comprises a paper sheet (the "raw" photobase) coated on both sides with a waterproof coating, which in recent years is of polyethylene (except for some specialist products). The polyethylene is pigmented with a pigment which is white (except for specialist products) and which is usually titanium dioxide ($TiO_2$). The usual method of coating is by extrusion of the coating on to the paper. The paper if identified with a "face side" and "wire side" (from Fourdrinier paper-making terminology) and it is the superior face side which when coated will receive the energy-sensitive imaging layer as a further coating.

There is a practical limit to the amount of $TiO_2$, which can be incorporated in a polyethylene for extrusion. Above about 15 to 20 wt. % of $TiO_2$, there is the prospect that the material will tend to accumulate on the lips of the extrusion die and thereby create a heterogeneous product. However, the polyethylene itself is quite capable of carrying much more $TiO_2$ pigment. Indeed, it is supplied from pigment suppliers to photobase makers in the form of a "masterbatch", usually of 50 wt. % pigment 50% resin mixture.

In U.S. Pat. No. 4,263,080 of Whiting Jr. assigned to Ludlow Corporation there is described how a high opacity packaging material can be created by co-extruding a three-layer structure of which the middle layer has a very high loading of carbon black. By this means, it is stated, "severe rheological and sticking problems" are avoided, and there is "minimal build up of material on the die surfaces". The two outer co-extruded layers are of a thickness of 12 μm.

The use of a co-extrusion method to make photobase has been proposed from time to time. See, for example, Fuji's GB-A-1339045 (mentioned above), Schoeller's GB-A-2061131 and Wiggins Teap's EP-A1-0 183 467. The last-mentioned disclosure is significant in that it discussed many different structures and is a relatively recent publication. It discloses the use of a combination of an upper layer of polycarbonate material, optionally pigmented, with a lower layer of pigmented polyethylene to achieve higher than expected levels of stiffness in the resulting photobase. It contains no mention of the consequences for image sharpness of moving from a mono-extruded to a co-extruded coating structure.

SUMMARY OF THE INVENTION

It is one object of the present invention to determine whether acceptable photodefinition levels, at least comparable with those achieved in the current mono-extruded photobase products, can be achieved in a co-extruded product and, if so, to specify those structures which are acceptable.

According to the present invention there is provided a substrate for an imaging layer which is to carry an image to be viewed by reflected light the substrate comprising a base sheet with a face side and wire side, the face side having an opaque co-extruded polymeric face side coating comprising at least:

i a core layer bearing a particulate opacifying pigment, and ii a top surface layer of low density polyethylene (other than linear low density polyethylene) having first and second faces, the first face being for receipt of the imaging layer and the second face being for contact with the core layer;

the substrate being characterized in that:

iii the thickness of the top surface layer is no grater than 12 μm;

iv the total content of opacifying pigment in the face side coating is at least 3 $gm^{-2}$;

v the proportion by weight of pigment in the core layer is greater than the proportion by weight of the pigment in the top surface layer by at least 1.75 to 1.00.

It is expected that the method of manufacture of the at least two layer face side coating will be by simultaneous co-extrusion of the layer structure. In such a case it is expected that the core layer will be extruded between the top surface layer and a lower layer, with the pigment content of the top surface and lower layer low enough to avoid fouling of the die lips with pigment.

The proportion by weight of pigment in the top surface layer, however, would normally be less than the minimum to avoid fouling that is to say, normally less than about 15 wt. %, probably no more than 10 wt. % and preferably no more than about 5 wt. %. Most preferably for highest photodefinition, the surface layer contains no pigment at all. This is startlingly unexpected and surprising, directly contrary to conventional wisdom in this art, but it is what has emerged from Applicant's research and experiments. For the time being at least, Applicant can offer no explanation for the phenomenon.

The top surface layer is of polyethylene, thereby to optimize acceptability of the photobase of the invention to sensitizer companies.

The core layer and any lower layer present will normally be of polyolefin-based composition. For economy, the core layer may also be of polyethylene, but other polymers could be incorporated in a blend, or could replace the polyolefin completely in the core layer, when conditions make it appropriate. Specifically, a blend of low density and high density polyethylenes has been found to optimize pigment dispersion at high pigment levels in the core layer.

The weight per unit area of each layer (its "coatweight") will depend upon the specific requirements of the photobase user, that is, the customer sensitizer company. For example, a so-called "PTS" paper (phototypesetting paper) conventionally has a face side coating of 15 $gm^{-2}$ polyethylene ("PE") with a pigment content of 15 wt. % $TiO_2$. With the invention this could be replaced by a core layer of 11 $gm^{-2}$ PE at 66 wt. % $TiO_2$ flanked by top surface and lower layers each of 2 $gm^{-2}$ PE at 20 wt. % $TiO_2$ or a core layer of the same thickness carrying 74 wt. % $TiO_2$ flanked by top surface and lower layers devoid of pigment, and both these structures should according to Applicant's experiments yield a photodefinition quality about 10% up on that of the conventional product.

In another example, a conventional monochrome photobase has a face side coating of 40 $gm^{-2}$ PE with a pigment loading of 10 wt. %. Applicant's results given below would suggest that an improvement in photodefinition of no less than 20% is achievable by the use of an top surface layer and a lower layer each of 2 $gm^{-2}$ coatweight but both devoid of any pigment and with a core layer between then of 36 $gm^{-2}$ coatweight and pigment content of around 26 wt. %.

The results given below suggest that the benefit to photodefinition of a pigment-free top surface layer is progressively stronger as the pigment content of the face side coating rises, in particular above the range of from 3 $gm^{-2}$ to 10 $gm^{-2}$. It had been thought that pigment weight per unit area of core layer coating would be less significant than pigment concentration in the surface coating (on the basis that photodefinition would be affected by the surface, not bulk, characteristics of the coating). Yet, no significant correlation between pigment concentration and photodefinition could be found.

The results below further indicate that optimum photodefinition is achieved with a thin top surface layer, that is, preferably no more than 8 μm, more preferably 5 μm or less, and most preferably no more than 3 μm. Layers less than 1.5 μm are difficult to co-extrude on a continuous, controlled basis.

The known technology of production of resin-coated substrates for imaging layers includes for example the use of dyes and optical brightening agents, stabilizers and antioxidants in the resin compositions, and the use of a corona treatment to improve adhesion between the resin and the base sheet. It is known to use a polymeric tie layer between two co-extruded polymer layers to improve adhesion between the layers. This known technoloy is to be applied, as appropriate, to the structures of the present invention.

DETAILED DESCRIPTION

In this specification, numerical values of photodefinition are established by a test procedure which involves exposure of the imaging material in question to a range of strengths of incident radiation, in order to produce a plot of image density against the logarithm (S) of the exposure (X) which the material has suffered. This procedure is repeated with a grid of opaque lines (spacing 2.365 $mm^{-1}$) overlying the imaging material, and this naturally has the effect of requiring greater exposure to the radiation to achieve a given density. From the superimposed plots, the quantity $$\Delta\log X = \Delta S(1.0) - \Delta S(0.1)$$

where

ΔLog X=Image Sharpness

ΔS(1.0)=Increase in log. of exposure on superimposition of grid, measured at image density of 1.0 above fog.

ΔS(0.1)=Increase in log. of exposure on superimposition of grid, measured at image density of 0.1 above fog.

can be established, and it is this value for image sharpness which is given herein as a numerical measure of "photodefinition".

In the Examples which follow, the extruded structures the subject of the tests were of photographic grade paper with a conventional wire side PE coating and one of three different face side coatings. Experimental co-extruded structures, shown in transverse section in the attached FIG. 1, comprised a photographic base paper 10, a wire side PE coating 11 and a 3 layer co-extruded face side PE coating comprising a lower layer B a core layer P and a top surface layer E. The polymer used in the core layer P was a mixture (LD/HD) of low density polyethylene and high density polyethylene. The low density component was of Chevron Oil's Grade 4516 (or Grade 1017) polyethylene (Chevron Oil, Orange, Tex. 77360, USA). The high density component was of Grade 7250 or 7840 from E.I. DuPont de Nemours & Co. Inc., Polymer Products Dept., Wilmington, Del. 19898, USA. Pigment was incorporated as a masterbatch of 50 wt. % $TiO_2$/50 wt. % polyethylene, Grade 11171 from Ampacet International Corporation, 250 South Terrace Avenue, Mount Vernon, N.Y. 10550, USA. The top surface E and lower layers B were of 100% low density PE (as above) whenever unpigmented. When pigmented they were of the LD/HD blend mentioned above. In this specification "low density" PE means PE with a density of less than 0.940 $gcm^{-3}$. "High density" PE's are those with a density of 0.940 $gcm^{-3}$ and above.

Coatweights were calculated by microscopic study of the transverse thickness of the extruded product, followed by computation of the product of coating thickness and density to yield coatweight. From the calculated coatweight and the known concentration of pigment in the extrudate the pigment bulk ($gm^{-2}$) in each coating layer was calculated. A photodefinition index PD was calculated by the method described above. The results given in Table 1 (below) are displayed graphically in various ways in FIGS. 2, 3 and 4.

Referring to FIG. 2, the results of Table 1 are plotted as three straight lines of best fit together with rectangle A which shows the area occupied by current production material made by mono-extrusion and included in Table 1 as results of samples M.

The circular data points are for face side structures with top surface and lower layers devoid of pigment (C-P-C structures) and yields the chain-dotted C-P-C line.

The square data points are for structures in which the lower layer is again clear but the top surface layer is pigmented (P-P-C structures). These points yield the full line as the straight lines of best fit.

The diamond-shaped data points are for structures in which the top surface layer is clear but the lower layer is pigmented (C-P-P structures). These points yield the dashed line as the straight line of best fit.

The following features emerge:

i the C-P-P structures give better photodefinition than the P-P-C structures over all pigment weights ii the C-P-C structures start to give better photodefinition than the P-P-C structures at about 10 $gm^{-2}$ of pigment iii below about 3 $gm^{-2}$ of pigment, the photodefinition performance of the C-P-C structures is not as high as in current production material (although C-P-P material with as little as $^{-2}$ 1 $gm^{-2}$ of pigment can match current production material).

Referring now to FIG. 3, three different lines of best fit have been established on the same axes and same data points, but only those relating to the structures with unpigmented top and lower layers. The full line is for those points which derive from structures with a top surface layer not more than 2 μm thick. The dashed line is for structures with a top layer more than 2 μm but not more than 4 μm thick. The chain dotted line covers structures with a top surface layer more than 6 μm thick but not thicker than 8 μm. There are not enough data points to permit a meaningful line of best fit to be drawn for 6–8 μm clear top surface layer structures.

Figure 1:
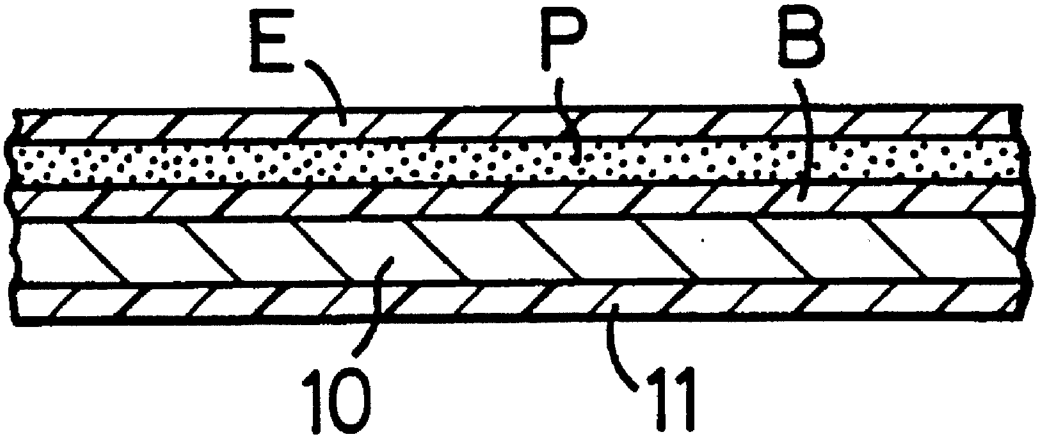
Figure 2:
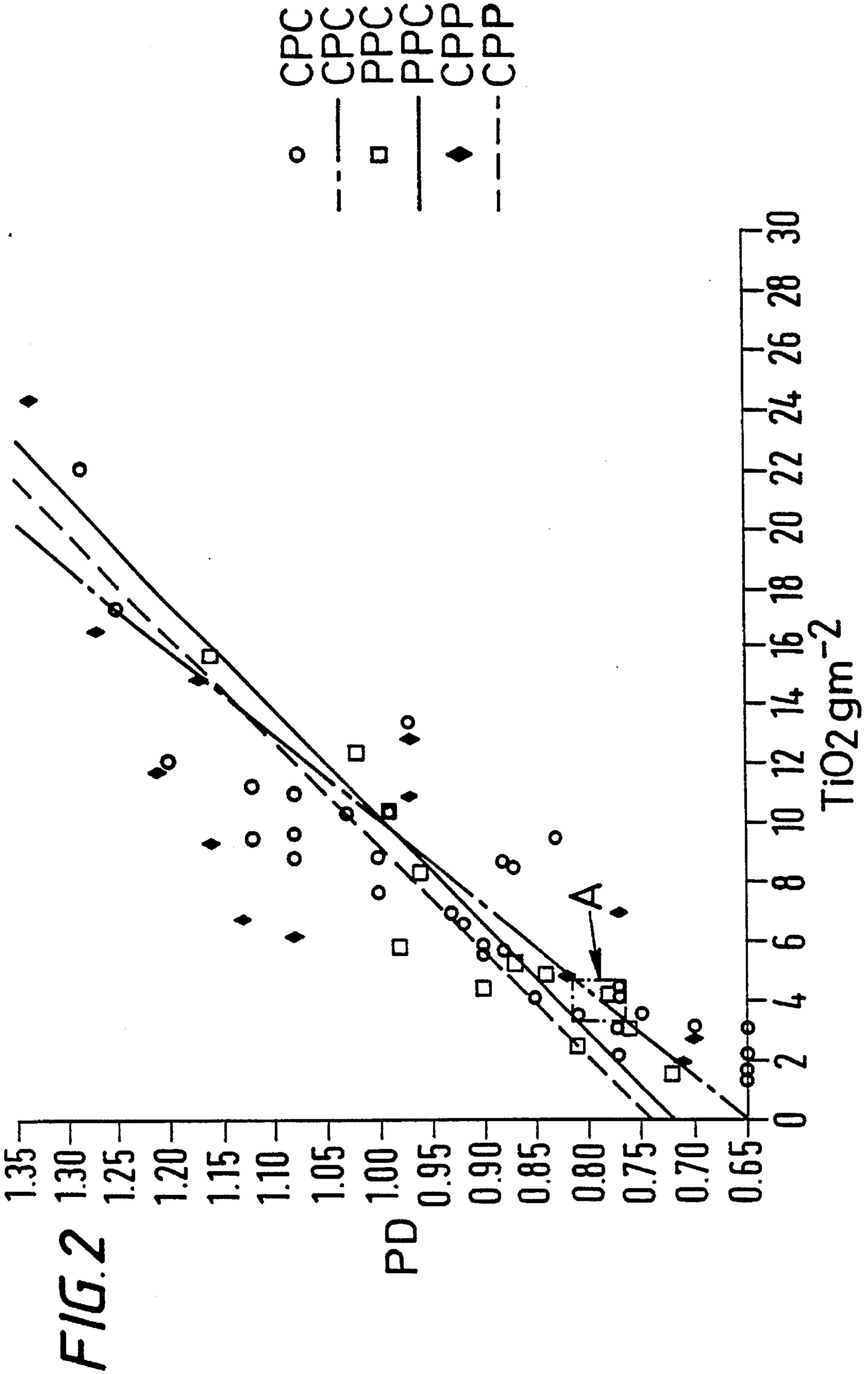
Figure 3:
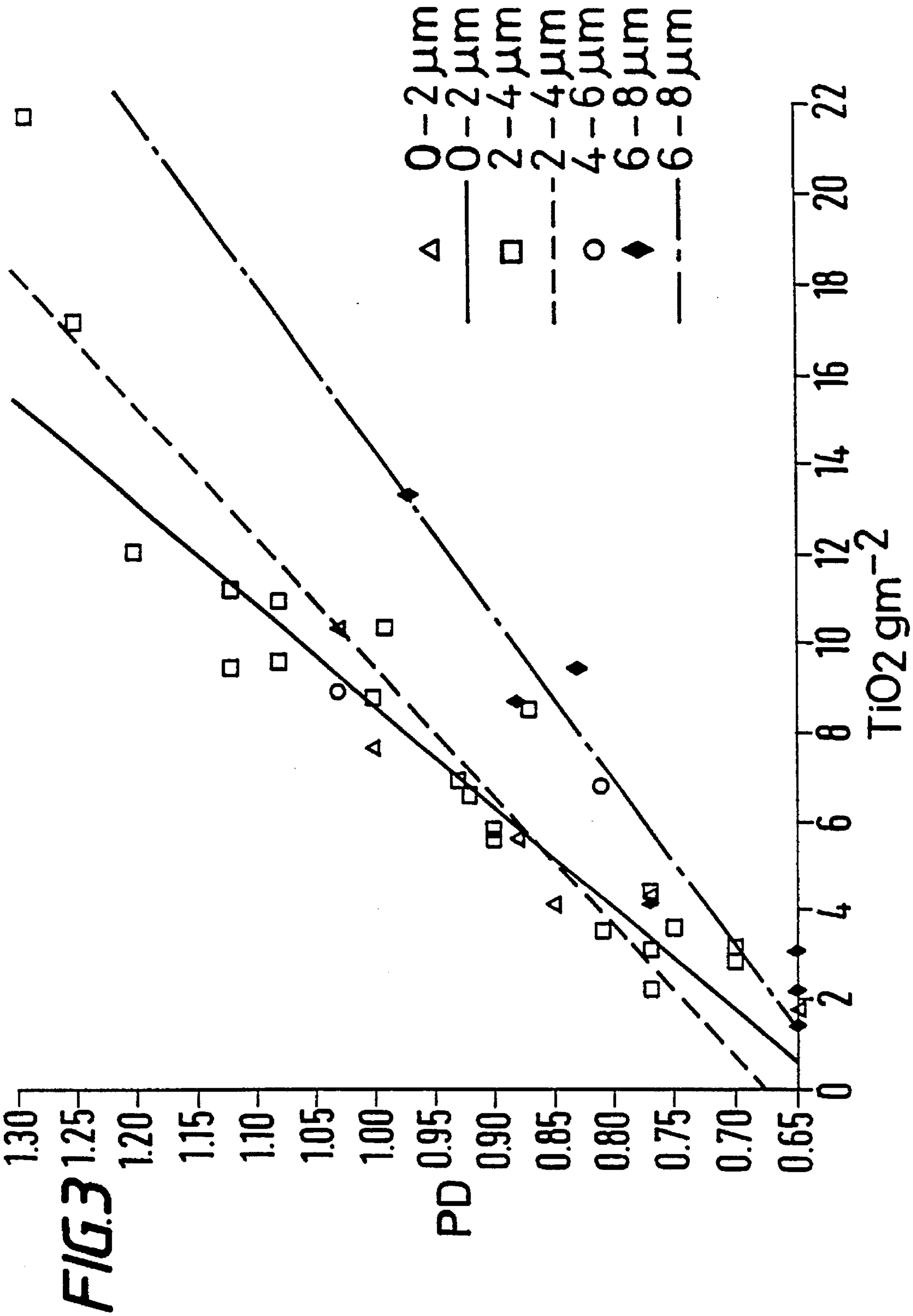
FIG. 3 shows how the thinner is the clear top layer the better is the resulting photodefinition.
Figure 4:
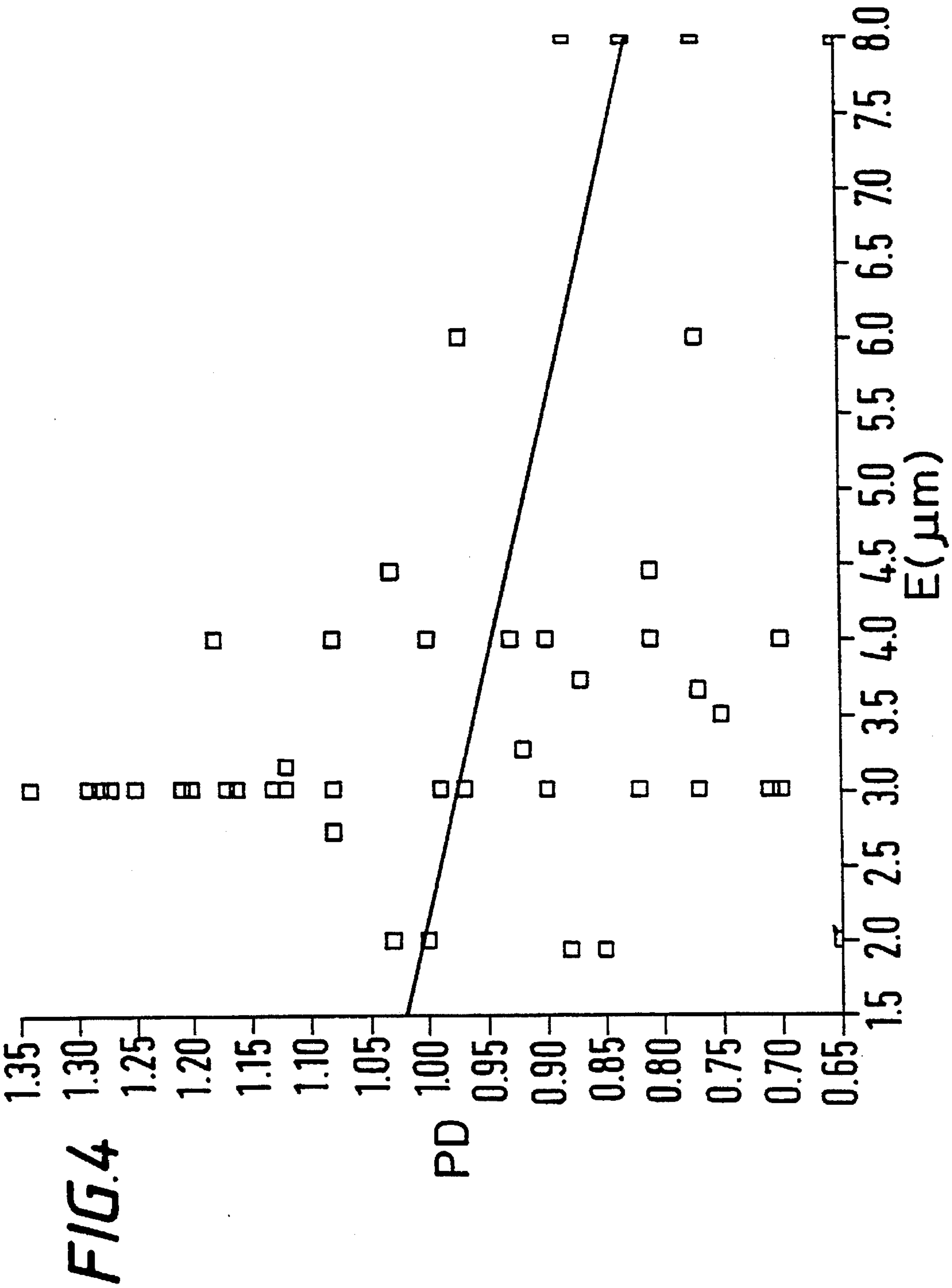
FIG. 4 is a plot of the relevant data used to produce FIG. 2, but with the thickness of the clear top layer E as the horizontal axis. The line of best fit gives an indication how quickly the photodefinition level falls with increasing clear top surface layer thickness.

The substrate of the present invention is suited for use as a phototypesetting paper with the total weight of the co-extruded face side coating is around 15 $gm^{-2}$ and the total content of opacifying pigment in the coating is around 3 $gm^{-2}$. Additionally, the substrate of the present invention is suited for use as a monochrome photographic base paper when the total weight of the co-extruded face side coating is around 40 $gm^{-2}$ and the total content of opacifying pigment in the coating is around 7.5 $gm^{-2}$. Furthermore, the substrate is of the invention suited for use as a color photographic base paper when the total weight of the co-extruded face side coating is around 30 $gm^{-2}$ and the total content of opacifying pigment in the coating is around 5.5 $gm^{-2}$.

TABLE 1

FACE SIDE COATING DETAILS

| STRUCTURE | COATWEIGHT ($gm^{-2}$) | | | | THICKNESS (μm) | | | | PIGMENT CONTENT (X wt %, Y $gm^{-2}$) TOTAL | | E | | P | | PHOTO-DEFINITION |
|---|---|---|---|---|---|---|---|---|---|---|---|---|---|---|---|
| (M, 3/1, 3/2) | TOTAL | E | P | B | TOTAL | E | P | B | X | Y | X | Y | X | Y | INDEX (PD) |
| M | 40 | | | | 41 | | | | 10 | 4 | | | | | 0.7 |
| " | 40 | | | | 41 | | | | 10 | 4 | | | | | 0.79 |
| " | 40 | | | | 41 | | | | 10 | 4 | | | | | 0.82 |
| " | 40 | | | | 41 | | | | 10 | 4 | | | | | 0.83 |
| 3/1 | 24.9 | 1.85 | 21.20 | 1.85 | 24.0 | 2.0 | 20.0 | 2.0 | 7.0 | 1.7 | | | 8.2 | 1.7 | 0.65 |
| " | 43.5 | 3.70 | 37.96 | 1.85 | 38.0 | 4.0 | 32.0 | 2.0 | 8.0 | 3.5 | | | 9.7 | 3.5 | 0.81 |
| " | 28.4 | 3.70 | 22.86 | 1.85 | 30.0 | 4.0 | 24.0 | 2.0 | 20.3 | 5.8 | | | 25.2 | 5.8 | 0.80 |
| " | 43.8 | 1.85 | 40.10 | 1.85 | 38.0 | 2.0 | 34.0 | 2.0 | 23.2 | 10.2 | | | 25.8 | 10.2 | 1.03 |
| " | 23.6 | 3.70 | 21.26 | 1.85 | 22.0 | 4.0 | 16.0 | 2.0 | 32.2 | 8.7 | | | 40.7 | 8.7 | 1.00 |
| " | 28.6 | 7.39 | 19.36 | 1.85 | 34.0 | 8.0 | 24.0 | 2.0 | 7.6 | 2.2 | | | 11.2 | 2.2 | 0.65 |
| " | 43.2 | 7.39 | 33.96 | 1.85 | 54.0 | 8.0 | 44.0 | 2.0 | 7.1 | 3.1 | | | 8.8 | 3.1 | 0.65 |
| " | 40.6 | 7.39 | 31.36 | 1.85 | 34.0 | 8.0 | 24.0 | 2.0 | 21.2 | 8.6 | | | 30.3 | 8.6 | 0.88 |
| " | 32.5 | 7.39 | 21.41 | 3.70 | 32.0 | 8.0 | 20.0 | 4.0 | 28.8 | 9.4 | | | 43.7 | 9.4 | 0.83 |
| " | 26.1 | 7.39 | 16.86 | 1.85 | 26.0 | 8.0 | 16.0 | 2.0 | 5.4 | 1.4 | | | 8.4 | 1.4 | 0.65 |
| " | 51.1 | 5.54 | 41.86 | 3.70 | 52.0 | 6.0 | 42.0 | 4.0 | 8.4 | 4.3 | | | 10.8 | 4.3 | 0.77 |
| " | 28.0 | 7.39 | 18.76 | 1.85 | 26.0 | 8.0 | 16.0 | 2.0 | 14.7 | 4.1 | | | 21.9 | 4.1 | 0.77 |
| " | 50.9 | 5.54 | 43.51 | 1.85 | 54.0 | 6.0 | 46.0 | 2.0 | 26.0 | 13.2 | | | 30.6 | 13.2 | 0.97 |
| 3/2 | 24.1 | 3.70 | 18.56 | 1.85 | 26.0 | 4.0 | 20.0 | 2.0 | 10.2 | 2.5 | 3.17 | 0.12 | 12.62 | 2.34 | 0.81 |
| " | 37.5 | 3.70 | 30.11 | 3.70 | 36.0 | 4.0 | 28.0 | 4.0 | 11.1 | 4.2 | 2.75 | 0.10 | 13.48 | 4.06 | 0.78 |
| " | 20.5 | 7.39 | 11.26 | 1.85 | 26.0 | 8.0 | 16.0 | 2.0 | 7.5 | 1.5 | 2.31 | 0.17 | 12.14 | 1.37 | 0.72 |
| " | 48.3 | 7.39 | 35.36 | 5.54 | 54.0 | 8.0 | 40.0 | 6.0 | 10.0 | 4.8 | 3.84 | 0.28 | 12.85 | 4.55 | 0.84 |
| " | 30.0 | 7.39 | 20.76 | 1.85 | 26.0 | 8.0 | 16.0 | 2.0 | 17.3 | 5.2 | 3.34 | 0.25 | 23.01 | 4.94 | 0.87 |
| " | 54.8 | 7.39 | 45.56 | 1.85 | 48.0 | 8.0 | 38.0 | 2.0 | 22.2 | 12.2 | 4.01 | 0.30 | 26.05 | 11.87 | 1.02 |
| " | 28.2 | 7.39 | 18.96 | 1.85 | 20.0 | 8.0 | 10.0 | 2.0 | 29.0 | 8.2 | 3.35 | 0.25 | 41.83 | 7.93 | 0.96 |
| " | 40.0 | 11.09 | 25.22 | 3.70 | 40.0 | 12.0 | 24.0 | 4.0 | 7.6 | 3.0 | 2.35 | 0.26 | 11.02 | 2.78 | 0.76 |
| " | 27.6 | 7.39 | 16.51 | 3.70 | 24.0 | 8.0 | 12.0 | 4.0 | 15.8 | 4.4 | 4.13 | 0.30 | 24.56 | 4.04 | 0.90 |
| " | 50.0 | 14.78 | 33.37 | 1.85 | 48.0 | 16.0 | 30.0 | 2.0 | 20.5 | 10.3 | 4.75 | 0.70 | 28.61 | 9.55 | 0.99 |
| " | 26.3 | 9.24 | 15.21 | 1.85 | 24.0 | 10.0 | 12.0 | 2.0 | 21.8 | 5.7 | 2.78 | 0.26 | 36.00 | 5.48 | 0.98 |
| " | 48.0 | 7.39 | 38.76 | 1.85 | 42.0 | 8.0 | 32.0 | 2.0 | 31.9 | 15.3 | 4.75 | 0.35 | 38.60 | 14.96 | 1.16 |
| 3/1 | 40.7 | 3.23 | 21.3 | 16.17 | 35 | 3.5 | 16.6 | 17.5 | 8.8 | 3.6 | | | 16.8 | 3.6 | 0.75 |
| " | 35.4 | 3.38 | 26.78 | 5.23 | 33.3 | 3.66 | 23.88 | 5.66 | 8.7 | 3.1 | | | 11.5 | 3.1 | 0.77 |
| " | 43.4 | 4.12 | 18.42 | 20.83 | 49.6 | 4.46 | 22.57 | 22.57 | 15.5 | 6.70 | | | 36.5 | 6.70 | 0.81 |
| " | 38.2 | 1.79 | 38.2 | 2.69 | 38.8 | 1.94 | 33.93 | 2.91 | 10.7 | 4.10 | | | 10.7 | 4.10 | 0.85 |
| " | 45.8 | 3.44 | 22.88 | 19.48 | 49.6 | 3.72 | 24.8 | 21.08 | 18.4 | 8.40 | | | 36.8 | 8.40 | 0.87 |

TABLE 1-continued

| FACE SIDE COATING DETAILS | | | | | | | | | | | | | | | | |
|---|---|---|---|---|---|---|---|---|---|---|---|---|---|---|---|---|
| " | 37 | 1.79 | 27.75 | 7.46 | 32.3 | 1.94 | 22.29 | 8.08 | 15.1 | 5.6 | | | 20.1 | 5.6 | 0.88 |
| " | 40.5 | 3.02 | 35.13 | 2.35 | 36.3 | 3.27 | 30.49 | 2.54 | 16.1 | 7.5 | | | 18.6 | 7.5 | 0.92 |
| " | 39.5 | 1.85 | 29.96 | 7.69 | 33.3 | 2 | 22.98 | 8.33 | 19.1 | 7.5 | | | 25.2 | 7.5 | 1.00 |
| " | 43.9 | 4.1 | 38.06 | 1.71 | 37 | 4.44 | 30.71 | 1.85 | 20 | 8.8 | | | 23.1 | 8.8 | 1.03 |
| " | 44.1 | 2.51 | 29.96 | 11.62 | 34 | 2.72 | 18.7 | 12.58 | 24.5 | 10.8 | | | 36.1 | 10.8 | 1.08 |
| " | 44.7 | 2.41 | 40.5 | 1.29 | 35 | 3.15 | 30.45 | 1.4 | 24.7 | 11 | | | 27.3 | 11 | 1.12 |
| " | 24.34 | 2.77 | 18.80 | 2.77 | 34.0 | 3.0 | 28.0 | 3.0 | 4.96 | 8.18 | | | 11.60 | 2.18 | 0.77 |
| " | 56.10 | 3.70 | 49.97 | 3.05 | 59.0 | 4.0 | 52.0 | 3.0 | 12.22 | 6.86 | | | 13.72 | 6.86 | 0.93 |
| " | 37.40 | 2.77 | 30.60 | 3.89 | 39.0 | 3.0 | 32.0 | 4.0 | 24.85 | 9.29 | | | 30.37 | 9.29 | 1.12 |
| " | 33.20 | 2.77 | 26.18 | 3.51 | 30.0 | 3.0 | 24.0 | 3.0 | 35.71 | 11.86 | | | 45.29 | 11.86 | 1.2 |
| " | 46.26 | 2.77 | 40.72 | 2.77 | 46.0 | 3.0 | 40.0 | 3.0 | 36.51 | 16.89 | | | 41.40 | 16.89 | 1.25 |
| " | 29.90 | 2.77 | 22.51 | 3.70 | 30.0 | 3.0 | 24.0 | 3.0 | 9.40 | 2.83 | | | 12.59 | 2.83 | 0.7 |
| " | 46.30 | 2.77 | 37.83 | 4.78 | 51.0 | 3.0 | 44.0 | 4.0 | 6.83 | 3.16 | | | 8.34 | 3.16 | 0.7 |
| " | 43.50 | 2.77 | 37.48 | 3.44 | 43.0 | 3.0 | 36.0 | 4.0 | 21.66 | 9.42 | | | 25.14 | 9.42 | 1.09 |
| " | 31.50 | 2.77 | 26.70 | 2.75 | 35.0 | 3.0 | 28.0 | 4.0 | 32.38 | 10.20 | | | 38.20 | 10.20 | 0.99 |
| " | 48.90 | 2.77 | 42.57 | 3.62 | 47.0 | 3.0 | 40.0 | 4.0 | 21.10 | 10.32 | | | 24.24 | 10.32 | 0.7 |
| " | 48.50 | 2.77 | 42.62 | 3.36 | 55.0 | 3.0 | 48.0 | 4.0 | 9.03 | 4.38 | | | 10.28 | 4.38 | 0.72 |
| " | 24.60 | 2.77 | 19.91 | 2.35 | 26.0 | 3.0 | 20.0 | 3.0 | 22.54 | 5.54 | | | 27.85 | 5.54 | 0.9 |
| " | 62.80 | 2.77 | 56.08 | 3.95 | 51.0 | 3.0 | 44.0 | 4.0 | 34.13 | 21.43 | | | 38.22 | 21.43 | 1.29 |
| STRUCTURE | COATWEIGHT (gm$^{-2}$) | | | | THICKNESS (μm) | | | | PIGMENT CONTENT (X wt %, Y gm$^{-2}$) TOTAL | | B | | P | | PHOTO-DEFINITION |
| (M, 3/1, 3/2) | TOTAL | E | P | B | TOTAL | E | P | B | X | Y | X | Y | X | Y | INDEX (PD) |
| 3/2 | 29.00 | 3.70 | 23.15 | 2.15 | 28.0 | 4.0 | 21.8 | 2.2 | 9.39 | 2.72 | 6.33 | 0.14 | 11.17 | 2.59 | 0.7 |
| " | 45.70 | 2.77 | 41.05 | 1.88 | 43.0 | 3.0 | 38.1 | 1.9 | 10.51 | 4.80 | 6.40 | 0.12 | 11.41 | 6.40 | 0.82 |
| " | 29.30 | 2.77 | 23.76 | 2.76 | 31.0 | 3.0 | 25.2 | 2.8 | 22.62 | 6.63 | 4.80 | 0.13 | 27.33 | 6.50 | 1.13 |
| " | 27.95 | 2.77 | 22.81 | 2.37 | 27.0 | 3.0 | 21.6 | 2.4 | 21.70 | 6.07 | 5.12 | 0.12 | 26.06 | 5.94 | 1.08 |
| " | 40.91 | 2.77 | 36.26 | 1.88 | 43.0 | 3.0 | 38.1 | 1.9 | 22.37 | 9.15 | 4.88 | 0.09 | 24.98 | 9.06 | 1.16 |
| " | 31.30 | 2.77 | 26.38 | 2.15 | 27.0 | 3.0 | 21.8 | 2.2 | 36.67 | 11.48 | 6.40 | 0.14 | 42.99 | 11.34 | 1.21 |
| " | 26.10 | 2.77 | 17.99 | 5.34 | 27.0 | 3.0 | 18.6 | 5.4 | 7.58 | 1.98 | 4.71 | 0.25 | 9.60 | 1.83 | 0.71 |
| " | 60.10 | 2.77 | 50.58 | 6.75 | 57.0 | 3.0 | 47.2 | 6.8 | 11.53 | 6.93 | 6.98 | 0.47 | 12.77 | 6.46 | 0.77 |
| " | 45.90 | 2.77 | 34.22 | 8.91 | 43.0 | 3.0 | 31.0 | 8.0 | 23.39 | 10.74 | 6.63 | 0.59 | 29.65 | 10.15 | 0.97 |
| " | 72.20 | 2.77 | 61.42 | 8.00 | 67.0 | 3.0 | 55.9 | 8.1 | 20.10 | 14.51 | 5.08 | 0.41 | 22.96 | 14.11 | 1.17 |
| " | 111.20 | 2.77 | 86.32 | 22.11 | 115.0 | 3.0 | 89.6 | 11.38 | 12.65 | 13.05 | 6.30 | 1.39 | 13.05 | 11.26 | 0.97 |
| " | 75.51 | 2.77 | 45.10 | 27.64 | 87.0 | 3.0 | 56.0 | 28.0 | 21.35 | 16.12 | 5.25 | 1.45 | 32.53 | 14.67 | 1.27 |
| " | 64.70 | 2.77 | 48.80 | 13.13 | 43.0 | 3.0 | 26.7 | 13.3 | 36.52 | 23.63 | 10.62 | 1.39 | 45.56 | 22.23 | 1.34 |

KEY TO TABLE 1
3/1 = 3 layer co-extruded structure only core layer pigmented
3/2 = 3 layer co-extruded structure with core and either lower or top surface layer pignmented to different levels.
E = top surface layer.
p = core layer.
B = lower layer.
M = mono-extruded control samples taken from current production stock.

We claim:

1. A substrate for an imaging layer which is to carry an image to be viewed by reflected light, said substrate comprising:

a base sheet with a wire side and a face side; and an opaque co-extruded polymeric coating on said face side, said face side coating comprising:

i) a core layer bearing a particulate opacifying pigment; and ii) a top surface layer thereon having a thickness no greater than 12 μm and comprising low density polyethylene;

iii) a total content of opacifying pigment in the face side coating of at least 3 gm$^{-2}$; and iv) the top surface layer is devoid of pigment;

wherein the co-extruded face side coating includes a lower layer on the face of the core layer remote from the top surface layer.

2. A substrate as claimed in claim 1, wherein the thickness of the top surface layer is no grater than 8 μm.

3. A substrate as claimed in claim 2, wherein the thickness of the top surface layer is no grater than 5 μm.

4. A substrate as claimed in claim 3, wherein the thickness of the top surface layer is in a range of from 1.5 μm to 3.0 μm.

5. A substrate as claimed in claim 1, wherein the lower layer comprises a polyolefin.

6. A substrate as claimed in claim 5, wherein the lower layer comprises polyethylene.

7. A substrate as claimed in claim 1, wherein the lower layer carries some of the total content of the opacifying pigment in the face side coating.

8. A substrate as claimed in claim 7, wherein the total content of opacifying pigment in the face side coating is equal to or greater than about 10 gm$^{-2}$.

9. A substrate as claimed in claim 1 wherein the lower layer is devoid of pigment.

10. A substrate as claimed in claim 1, wherein the top surface layer comprises low density polyethylene other than linear low density polyethylene.

11. A substrate for an imaging layer which is to carry an image to be viewed by reflected light, said substrate comprising:

a base sheet with a wire side and a face side; and an opaque co-extruded polymeric coating on said face side, said face side coating comprising:

i) a bottom layer bearing a particulate opacifying pigment; and ii) a top surface layer thereon having a thickness no greater than 12 μm and comprising low density polyethylene other than linear low density polyethylene;

iii) a total content of opacifying pigment in the face side coating of at least 3 $gm^{-2}$; and iv) the top surface layer being devoid of pigment.

12. A substrate as claimed in claim 11, wherein the base sheet comprises paper.

13. A substrate as claimed in claim 12, wherein the paper is of photographic quality.

14. A substrate as claimed in claim 11, wherein the bottom layer comprises a polyolefin.

15. A substrate as claimed in claim 14, wherein the bottom layer comprises a blend of low density and high density polyethylene.

16. A substrate as claimed in claim 11, wherein at least a major proportion of the opacifying pigment is titanium dioxide.

17. A substrate as claimed in claim 11, wherein the total weight of the co-extruded face side coating is around 15 gm $^{-2}$, the total content of opacifying pigment in the said coating is around 3$gm^{-2}$ and the substrate is suitable for use as a phototypesetting paper.

18. A substrate as claimed in claim 11, wherein the total weight of the co-extruded face side coating is around 40 $gm^{-2}$, the total content of opacifying pigment in the said coating is around $7.5^{-2}$ gm and the substrate is suitable for use as a monochrome photographic base paper.

19. A substrate as claimed in claim 11, wherein the total weight of the co-extruded face side coating is around 30 $gm^{-2}$, the total content of opacifying pigment in the said coating is around 5.5 $gm^{-2}$ and the substrate is suitable for use as a colour photographic base paper.

20. A substrate as claimed in claim 11 wherein the total content of opacifying pigment in the face side coating is in the range of from 3 $gm^{-2}$ to 10 $gm^{-2}$.

21. A substrate as claimed in claim 11 wherein the total content of opacifying pigment in the face side coating is equal to or greater than about 10 $gm^{-2}$.

22. A substrate as claimed in claim 11, wherein the thickness of the top surface layer is no greater than 8 μm.

23. A substrate as claimed in claim 22, wherein the thickness of the top surface layer is no greater than 5 μm.

24. A substrate as claimed in claim 23, wherein the thickness of the top surface layer is in the range of from 1.5 μm to 3.0 μm.

25. A substrate as claimed in claim 11, wherein the total content of opacifying pigment in the face side coating is in the range of from 3 $gm^{-2}$ to 10 $gm^{-2}$.

* * * * *

UNITED STATES PATENT AND TRADEMARK OFFICE
CERTIFICATE OF CORRECTION

PATENT NO.: 5,476,708

DATED: December 19, 1995

INVENTOR(S): Roger J. REED, Paul DUNK, Christopher CUSICK

It is certified that error appears in the above-identified patent and that said Letters Patent is hereby corrected as shown below:

Column 2, line 24, change "Teap's" to --Teape's--;

Column 2, line 25, change "discussed" to --discusses--;

Column 2, line 57, change "grater" to --greater--;

Column 3, line 47, change "then" to --them--;

Column 5, line 26, change "$^{-2}1gm^{-2}$" to --$1gm^{-2}$--;

Column 7, line 42, change "p" to --P--;

Column 7, line 65, change "grater" to --greater--; and

Column 7, line 67, change "grater" to --greater--.

Signed and Sealed this

Ninth Day of July, 1996

Attest:

Bruce Lehman

BRUCE LEHMAN

*Attesting Officer*

*Commissioner of Patents and Trademarks*